July 1, 1969
H. L. SLATIN
3,453,187
APPARATUS AND PROCESS FOR REDUCTION OF HYDROGEN CHLORIDE
Filed Sept. 23, 1965
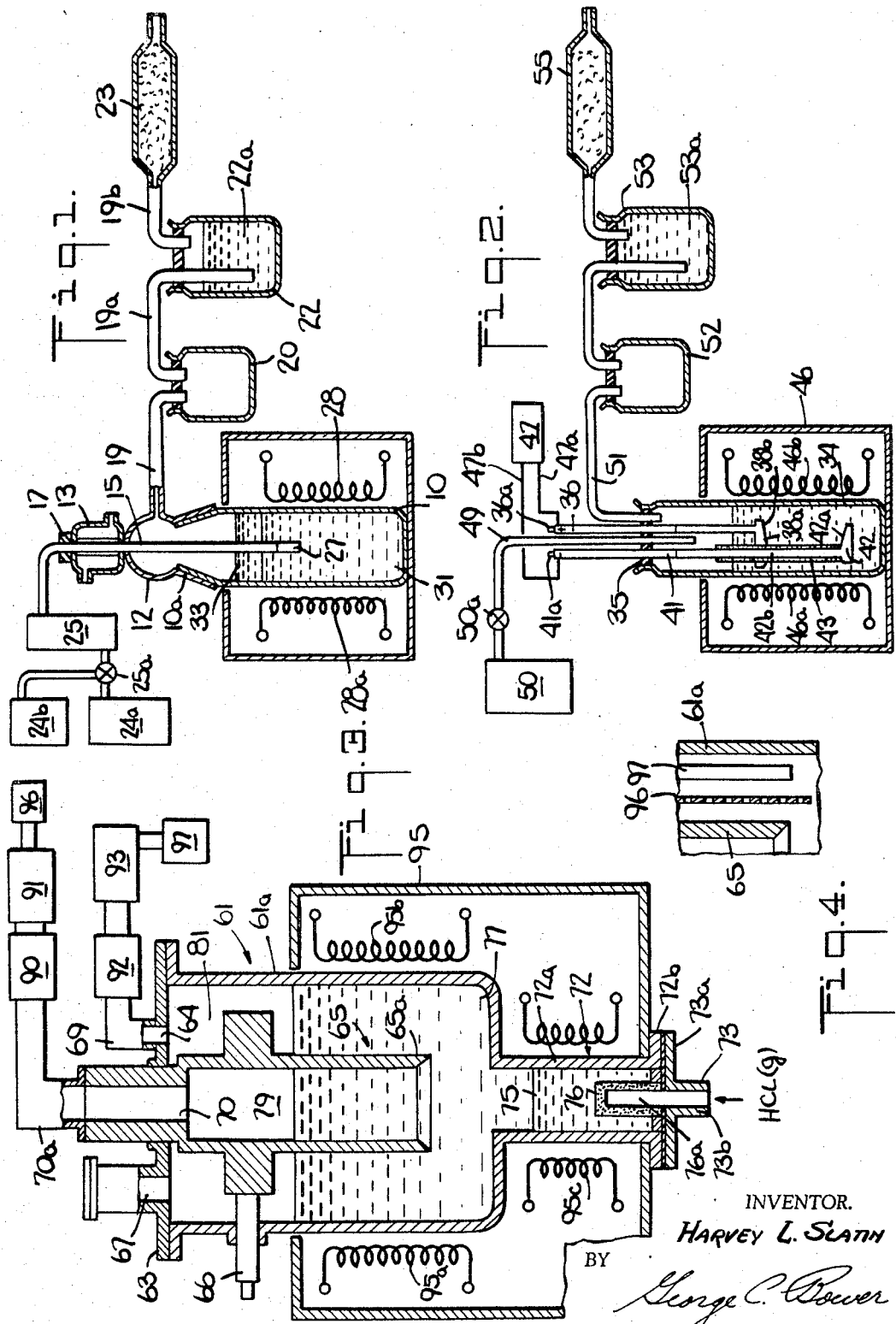
INVENTOR.
HARVEY L. SLATIN
BY
George C. Bower
ATTORNEY United States Patent Office 3,453,187
Patented July 1, 1969

3,453,187
APPARATUS AND PROCESS FOR REDUCTION OF HYDROGEN CHLORIDE
Harvey L. Slatin, New York, N.Y., assignor to Timax Associates, a partnership, New York, N.Y.
Filed Sept. 23, 1965, Ser. No. 489,478
Int. Cl. C22d 3/06, 3/02
U.S. Cl. 204—69           14 Claims

ABSTRACT OF THE DISCLOSURE

A process and apparatus in which anhydrous hydrogen chloride gas is reacted with a molten metal alloy to form dry, pure hydrogen and a metal chloride. The metal chloride is dissolved in an anhydrous fused salt bath comprising alkali and/or alkaline earth halides. The fused salt bath also contains a metal halide of the molten metal alloy. Electrolysis of the bath liberates chlorine and deposits the metal of the metal chloride.

---

This invention relates to the reclamation of hydrogen chloride and particularly to the regeneration of anhydrous chloride, obtained as a by-product in the chlorination of hydrocarbons, into its elements, hydrogen and chlorine.

The present petrochemical and organic chemical synthesis industries produce large quantities of by-product hydrogen chloride in the course of their processing. Much of this chemical is waste and is dumped into the ocean. More is chemically destroyed by treatment with soda ash, lime, or caustic. Such practice is costly and wasteful. Among the processes suggested for reclaiming hydrogen chloride are: (1) the catalytic oxidation of HCl; (2) the electrolysis of concentrated hydrochloride acid solutions; and (3) the electroylsis of cupric chloride solutions or $NiCl_2$ solutions. None of the processes have proved widely acceptable, with the possible exception of the electrolysis of hydrochloric acid concentrates, due to impracticability, poor economy, large installations, excessive corrosion and unsatisfactory conversions.

The principal object of this invention is to provide a process which will treat the by-product HCl directly and convert the anhydrous gas ot pure dry hydrogen and pure dry chlorine in a simple, efficient and economical manner.

An attendant object is to provide a process for the reclamation of HCl which requires a low capital investment and still has a large output with equipment of a small size.

Another object is to provide a process requiring a minimum of labor and no recycling of hydrogen chloride, and having the total operation of the process unitized.

Still another object is to provide a process which can be operated economically on a small or large scale and is adaptable to easy integration with present hydrocarbon chlorination plants.

These and other objects are attained by reacting anhydrous HCl gas with a molten metal alloy forming thereby dry pure hydrogen and a metal chloride. The metal chloride is dissolved in an anhydrous fused salt system comprising a bath of alkali and/or alkaline earth halides containing a fused metal halide of the molten metal alloy. The bath is electrolyzed to regenerate the reductant metal and liberate pure dry chlorine.

The chlorine gas recovered may be returned to the process or used for other purposes. The hydrogen gas may be burned, used as a rocket fuel or in the manufacture of ammonia, in hydrogenation processes or for any other purpose.

In the broadest sense, the process converts HCl to $H_2$ and $Cl_2$ in a single unit. In considering all the metals available in the periodic system, the following process restrictions prevail. The metals usable in the process of this invention (1) must react with anhydrous HCl at a rapid pace; (2) must not form volatile or refractory chlorides in the process; (3) must be liquid at the low temperature of electrolysis; (4) must have low vapor pressure at the operating temperature; (5) should have a moderate or low decomposition potential; (6) should have a moderate or high electrical conductivity; (7) the salts must not be hydroscopic; (8) the chloride formed should not be multivalent; (9) the chloride should have a low vapor pressure; and (10) the solubility of the metal in its salts should be low.

The following metals are rejected since they do not react with HCl at any reasonable rate: lead, silver, gold, platinum, nickel, antimony, arsenic, bismuth, cobalt, copper, mercury and tin.

The following metals are rejected since they form high melting chlorides: sodium, potassium, barium, magnesium, strontium, cerium, yttrium, manganese and lithium.

The following metals are rejected since they have a melting temperature that is too high: magnesium, aluminum, titanium, manganese, cerium, tantalum, uranium, calcium, barium, strontium, beryllium, molybdenum, tungsten, vanadium and yttrium.

The following metals are rejected for their high vapor pressure: cadmium, mercury, arsenic and potassium.

The following metals form chlorides which have high decomposition potentials: sodium, potassium, lithium, magnesium, aluminum, titanium, cerium, barium, beryllium, calcium, hafnium, zirconium, manganese, vanadium, thorium, uranium and yttrium.

The metal chlorides having too low conductivity for use are: zinc, aluminum, mercury and arsenic.

The salts having hygroscopicity are aluminum, beryllium, calcium, lithium, titanium, zirconium and zinc. These are rejected.

The metal salts rejected for multivalency are: antimony, bismuth, gallium, indium, iron, molybdenum, columbium, tantalum, titanium, tin, zirconium and cerium.

The metals rejected for forming volatile chlorides are: alumium, titanium, zirconium, mercury, tantalum, columbium, molybdenum, iron, tungsten, vanadium and tin.

The following metals are rejected for high solubility of the metal in its salts: barium, calcium, sodium, cadmium, potassium and strontium.

Since there is no metal ideal for use in this process, an alloy had to be formulated which fulfilled all of the restrictions set forth above. Cadmium metal alone is not usable, since it has a high vapor pressure and tends to dissolve in its salts. By adding tin to cadmium, its vapor pressure can be drastically reduced to where cadium can be used in the practice of the invention. The solubility of cadmium in the electrolyte is radically reduced by the presence of tin and by the formulation of eutectic salts containing cations other than cadmium.

Although lead, silver, gold, platinum, antimony, arsenic, bismuth, copper, mercury or tin could be used, tin is preferred because of its low vapor pressure and because of its high solubility for cadmium. In the chlorination process, cadmium is preferentially attacked by the hydrogen chloride. The tin remains inert. A preferred alloy contains 35% Cd and 65% Sn by weight and fuses at 350° F.

The salts may be composed of alkali and/or alkaline earth halides in which some $CdCl_2$ is dissolved. A preferred bath contains 23.1% KCl–13.5% NaCl–63.4% $CdCl_2$ melting at 716° F. Fluorides of the alkali and/or alkaline earth metals or cadmium may be added. Bromides and iodides are excluded.

Although the process of the invention is preferably and commercially carried out in a single unitized apparatus composed of a reactor and the electrolytic cell for the most economical operation, the process was performed and may be practiced in separate parts. A detailed description of the present process is set forth as follows in connection with the drawings in which FIG. 1 illustrates the apparatus for reducing anhydrous hydrogen chloride;

FIG. 2 illustrates the apparatus for electrolyzing the the metal chloride;

FIG. 3 illustrates the apparatus for performing the process in a single cell; and FIG. 4 fragmentarily illustrates modifications of the electrolytic cell.

Referring to FIG. 1 a Pyrex test tube 10 with an inside diameter of 70 mm. and a length of 358 mm. was used as a reactor. On the open end the reactor was provided with a standard tapered joint 10a. A cap 12 was mated with the joint 10a to form a liquid and gaseous seal therewith. A tube 15 extends through the top of the cap 12 in sealed relation therewith, and a water-cooled condenser surrounds the tube 15 above the cap 12. A rubber seal 17 tightly fitting on the tube 15 seals the open end of the condenser 13. The tube 15 is connected to a flow meter 25, which is in turn connected through a three way valve 25a to an inert gas supply 24a of argon and a gaseous supply 24b of anhydrous hydrogen chloride. The tube 15 feeds either argon or hydrogen chloride in the gaseous form into reactor 10 and a sintered glass disperser 27 is provided on the outlet of the tube to distribute the gas through the reactor.

The cap 12 has an outlet tube 19 leading to a stoppered trap 20. The outlet tube 19a from the trap 20 is connected to a stoppered absorber 22 filled with a caustic soda solution 22a to trap any unreacted hydrogen chloride. The tube 19a has a discharge end submerged in the caustic soda. The outlet tube 19b from the absorber 22 is connected to a drier 23 to dehydrate any inert gas passing through the apparatus.

The reactor 10 contains a molten alloy 31 comprising 65% tin and 35% cadmium and a fused salt mixture 33 comprising 23.1% potassium chloride, 13.5% sodium chloride and 63.4% cadmium chloride. The alloy and salt are maintained molten by a thermostatically controlled furnace 28 having electrical heating elements 28a, 28b. The outlet end of the tube 15 was immersed in the molten alloy a distance of one inch and the disperser 27 was one inch long, so that the over-all depth of immersion was two inches. The valve 25a was adjusted to provide a flow of argon gas from the supply 24a into the reactor 10 to create an inert atmosphere in the reactor while the contents of the reactor reached an opearting temperature of 750° to 800° F. When this operating temperature was reached, the valve 25a was adjusted to shut off the argon gas flow and feed gaseous anhydrous hydrogen chloride through the tube 15 and disperser 27. The chlorination reaction was then continued for two hours. The hydrogen chloride feed was then stopped and the argon gas feed resumed. The tube 15 and disperser 27 were withdrawn until the disperser was above the salt mixture 33. The reactor was then allowed to cool to room temperature.

It was noted that no solids or liquids were present in the trap. The record of the flow meter 25 showed how much hydrogen chloride had entered the reactor. The difference in weight between the reactor and its contents at the start of the run and at the end of the run establishes the gain in chlorine. The gain in weight of the absorber 23 determines the excess HCl passed unreacted through the reactor. There was no difference between the initial and final weights of the absorber 22 and the drier 23. Therefore, no excess hydrogen chloride occurs and all is converted by the process. The hydrogen chloride undergoing reaction was 37.4 grams, or at a calculated rate of .31 gram per minute. Within the limits of measurement, this compared favorably with the calculated weight determined by metering through the flow meter 25. From these results it can be seen that a cadmium-tin liquid alloy can be made to react with the anhydrous hydrogen chloride at 100% utilization or conversion.

The cadmium chloride formed by the reaction of the HCl with the molten metal alloy is dissolved in the fused salt 33. This fused salt was electrolyzed in the apparatus illustrated in FIG. 2 to separate the cadmium and chlorine.

In the apparatus of FIG. 2 the Pyrex glass test tube 34 formed the electrolytic cell and was 70 mm. in diameter and 360 mm. long. The open end of the cell was sealed with a stopper 35. Anode lead 36, cathode lead 41, inert gas inlet tube 49 and chlorine gas vent tube 51 pass through the stopper 35 and are in sealing relation therewith. The tube 49 is connected to an inert gas source 50 through a valve 50a for supplying the cell 34 with an inert atmosphere. The chlorine gas vent tube 51 is connected to a trap 52 for receiving the chlorine gas and the discharge tube 51a is connected to an absorber 53 filled with a caustic soda solution 53a. The tube 51a has its discharge end submerged in the caustic soda for bubbling the chlorine into the solution for absorption by the caustic soda solution. The discharge tube 51b from the absorber 53 is connected to the drier 55 to remove any moisture.

The anode 38a was shaped from a cylindrical graphite rod having a diameter of two inches, to form a cone-shaped surface 38b having a 15° slope to a horizontal plane. This facilitated chlorine escape from the conical surface of the anode. The anode 38a is connected by the graphite rod 38 to the lead 36 by a threaded type of connection. The lead 36 is water cooled by conduit means 36a.

The cathode 42 is similarly made of graphite from a two inch diameter rod, and shaped to have a conical surface 42a sloped at 15° to a horizontal plane. The rod shaped portion 42a of the cathode extends upwardly and is connected to the water-cooled lead 41 by a threaded connection. Water is supplied to the lead by conduit means 41a.

A sillimanite sleeve 43 is fitted around the cylindrical stem 42b of the cathode and through the anode 38a to electrically separate the anode and cathode. The electrolyte 44 is formed from the fused salts 33 and is melted by the heaters 46a and 46b of the thermostatically controlled furnace 46 in which the reactor 34 is positioned. The electrolyte 44 comprises 23.1% potassium chloride, 13.5% sodium chloride and 63.4% cadmium chloride and the electrolysis process is carried out under an atmosphere of argon gas. The electrolyte is heated to a temperature of 750° to 800° F. and a direct current is supplied to the leads 36 and 41 from the direct current source 47 by leads 47a, 47b. The cadmium chloride is reduced and the chlorine deposited on the conical surface 38b where it forms bubbles that are discharged as a gas through the tube 51. The cadmium is formed at the cathode surface 42a and collects at the bottom of the reactor 34 in the form of a one piece metal button. The chlorine is collected in the caustic soda solution 53a.

At the end of the run the electrodes are pulled out of the bath and the cell is allowed to cool to room temperature. The loss in weight of the cell represents the chlorine deposited and should be equal to the gain in weight of the absorber, provided that there are no changes from the initial weights of the trap and drier. No change in the weight of either the trap or drier was observed.

The back E.M.F. was 1.6 volts and the current efficiency is 100%. The anode and cathode current densities were 11.4 amperes per square inch. The composition of the electrolyte can be varied to include more or less cadmium chloride or fluoride in alkali and/or alkaline earth chlorides and/or fluorides. The current densities may be varied from 10 to 50 amperes per square inch or more.

In the foregoing description of the process the replacement of the hydrogen by cadmium was performed in the apparatus of FIG. 1 and the reduction of the cadmium chloride was performed in the apparatus of FIG. 2. For commercial operation of the process in its most economical manner, the two steps should be performed in a unitized cell and reactor.

In FIG. 3 a unitized cell and reactor apparatus is illustrated. The reactor portion 72 of the cell comprises a cylindrical member 72a having flanges 72b. A bottom member 73 is secured by the flanges 73a to the flanges 72b in sealed relation therewith. The bottom member has a centrally positioned feed pipe 73b for providing anhydrous HCl to the reactor portion through a carbon disperser 76. The carbon disperser is a porous cylindrical shaped member having an internal channel 76a. Sealing and holding means 76b are provided for securing the disperser 76 to the bottom member 73. The reactor portion 72 holds the molten metal alloy 75 comprising 65% tin and 35% cadmium. The reactor portion 72 forms with the hollow cylindrical member 61a the electrolytic cell 61 holding the fused salt bath 77 comprising 23.1% potassium chloride, 13.5% sodium chloride and 63.4% cadmium chloride. The fused salt electrolyte floats on top of the molten metal alloy 75 in a similar manner as in FIG. 1. The cylindrical member 61a also functions as the cathode of the cell. The cell is provided with a cover 63 for sealing the cell, and has a chlorine discharge port 64 and feed port 67 and means for supporting the anode 65. The anode 65 is tubular in shape to form an inner chamber 79 separate from the chamber 81 formed between the anode and the hollow cylindrical member 61a. The anode 65 has a passage 70 for discharging hydrogen that collects in the chamber 79. The vent 64 is connected to the chamber 81 for discharging the chlorine therefrom.

The anode 65 is formed from the graphite and is electrically connected to a direct current source by the water-cooled leads 66 extending through member 61a above the level of the electrolyte 77. The anode is positioned cencentrically above the molten alloy 75 and as the hydrogen is formed it bubbles through the surface of the alloy upwardly into the chamber 79 and out through the passage 70. The cadmium chloride is dissolved in the electrolyte 77 and reduced to chlorine on the exterior or outer surface 65a of the anode and bubbles out of the electrolyte into the chamber 81. The hydrogen is drawn from the anode through a pipe 70a, through a cooler 90 by a compressor 91 and discharged to storage means 96. The chlorine is drawn through the vents 64 and pipe 69 and cooler 92 by the compressor 93, and discharged to a storage means 97. The metal cadmium formed at the cathode is in the molten state and runs along the member 61a back to the molten alloy 75. The apparatus is maintained at the desired operating temperature of 750° to 800° F. by a thermostatically controlled furnace having windings 95a, 95b adjacent to member 61a and windings 95c, 95d adjacent to the reactor portion 72.

The steps of the process are as follows:
In the reactor:

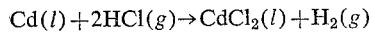

$$Cd(l) + 2HCl(g) \rightarrow CdCl_2(l) + H_2(g)$$

In the cell portion:

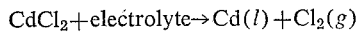

$$CdCl_2 + electrolyte \rightarrow Cd(l) + Cl_2(g)$$

Over-all reaction:

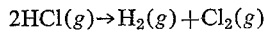

$$2HCl(g) \rightarrow H_2(g) + Cl_2(g)$$

In FIG. 4 a modification of the cell is illustrated in which a nickel metal screen 96 is interposed between the anode 65 and the cathode to prevent recombination of the electrolyte products at high current densities. The cathode may be a separate electrode 97 from the wall 61a with or without the metal screen.

In the embodiments of FIGS. 3 and 4 the graphite anode 65 is in the center and the cathode means 61a at the periphery of the electrolyte. This relation may be reversed and the cathode means positioned at the center and the anode at the periphery of the electrolyte. Thus in FIG. 4 electrode 97 may be a graphite anode and the electrode 65 may be the cathode. This arrangement further separates the chlorine and hydrogen gases and provides a more direct return of the molten cadmium metal to the pool 75. The molten alloy is preferably cadmium and tin. However, the other metals listed with tin may be used.

It is seen from the foregoing description that a continuous process for converting hydrogen chloride to gaseous hydrogen and chlorine by unitized apparatus is set forth, in which the process is performed at conventional industrial temperatures and pressures. The cadmium and tin alloy forms a molten pool at reasonable temperatures and low vapor pressure to rapidly produce hydrogen and the non-volatile, non-hydroscopic cadmium chloride which is readily soluble in the electrolyte. The electrolysis is simply performed to produce the chlorine gas separate from the hydrogen gas and to recreate the cadmium metal in liquid form insoluble in a salt bath so that it returns to the molten pool for the continuous reduction of hydrogen chloride.

The invention is set forth in the appended claims.

I claim:
1. A process for the reduction of anhydrous hydrogen chloride and the recovery of anhydrous chlorine comprising reacting anhydrous hydrogen chloride with a liquid cadmium alloy comprising cadmium metal and metallic elements more noble than cadmium to form therefrom hydrogen gas and cadmium chloride, dissolving and electrolyzing between an insoluble anode and cathode said cadmium chloride in a molten bath containing alkali and/or alkaline earth chlorides and/or fluorides, thereby regenerating said cadmium metal and discharging anhydrous chlorine gas at said insoluble anode.

2. A process for the reduction of anhydrous hydrogen chloride comprising reacting gaseous hydrogen chloride with a molten metal alloy of cadmium and a metallic element more noble than cadmium to form hydrogen gas and cadmium chloride, discharging the hydrogen from the molten metal alloy, dissolving the cadmium chloride in a fused salt bath and electrolyzing the cadmium chloride in the fused salt bath to produce molten cadmium metal and anhydrous chlorine gas and discharging the chlorine gas from the electrolyte.

3. In the method as set forth in claim 2 wherein the metal more noble than cadmium is tin.

4. A process for reduction of anhydrous hydrogen chloride comprising introducing gaseous anhydrous hydrogen chloride into a molten metal alloy of cadmium and a metallic element more noble than cadmium, reacting the hydrogen chloride with the cadmium metal to produce hydrogen gas and cadmium chloride, discharging the hydrogen upwardly through and dissolving the cadmium chloride in a fused salt bath positioned above and in contact with the molten metal alloy, discharging the gaseous hydrogen from the fused bath at a place above the molten metal alloy, electrolyzing the fused salt bath and forming molten cadmium metal and chlorine in the bath separate from the gaseous hydrogen and separately discharging the gaseous chlorine from the fused salt bath separate from the gaseous hydrogen.

5. A process for the reduction of hydrogen chloride comprising reacting gaseous hydrogen chloride with a liquid cadmium and tin alloy to form gaseous hydrogen and cadmium chloride insoluble in the liquid alloy, dissolving the cadmium chloride in a fused salt bath of potassium chloride, sodium chloride and cadmium chloride in direct surface to surface contact with the liquid alloy, discharging the gaseous hydrogen from the alloy upwardly through the molten fused salt bath separate from electrolytic action in the bath, electrolyzing the dissolved cadmium chloride to gaseous chlorine separate from the gaseous hydrogen and to liquid cadmium metal insoluble in the bath and returning the liquid cadmium metal to the alloy for continuous reduction of hydrogen chloride.

6. Apparatus for the reduction of hydrogen chloride comprising a reactor having means for holding a pool of molten metal alloy and means for introducing hydrogen chloride into the pool to react with one of the metals thereof to produce gaseous hydrogen and a metal chloride, an electrolytic cell on and above said reactor means having means for holding a fused salt electrolyte in contact with the pool of molten metal alloy for receiving the metal chloride as a solute therein and the hydrogen as an upward flow of gaseous bubbles, a tubular shaped anode having an outer electrolyzing surface and an inner chamber positioned above the molten metal alloy for receiving the gaseous hydrogen, cathode means spaced concentrically from the outer surface of said anode for electrolyzing the dissolved metal chloride reducing the chloride to gaseous chlorine on the outer surface of the anode and molten metal on the cathode means, said anode having means for discharging the gaseous hydrogen from the chamber and said cell having means for discharging the chlorine therefrom and returning the molten metal to said pool for a continuous reduction of the hydrogen chloride fed to the pool of molten metal alloy.

7. Apparatus for the reduction of hydrogen cloride comprising a reactor having means for holding a pool of molten metal alloy of cadmium and a metallic element more noble than cadmium and means for introducing hydrogen chloride into the pool to react with the cadmium to produce gaseous hydrogen and cadmium chloride, an electrolytic cell on and above said reactor means having means for holding a fused salt electrolyte in contact with the pool of molten metal alloy for receiving the cadmium chloride as a solute therein and the hydrogen as an upward flow of gaseous bubbles, a tubular shaped anode having an outer electrolyzing surface and an inner surface forming a chamber poistioned above the molten metal alloy for receiving the gaseous hydrogen, cathode means spaced concentrically from the outer surface of said anode for electrolyzing the dissolved cadmium chloride reducing the chloride to gaseous chlorine on the outer surface of the anode and molten cadmium on the cathode means, said anode having means for discharging the gaseous hydrogen from the chamber and said cell having means for discharging the chlorine therefrom and returning the molten cadmium to said pool for a continuous reduction of the hydrogen chloride fed to the pool of molten metal alloy.

8. Apparatus as set forth in claim 1 wherein said metallic element more noble than cadmium is tin.

9. Apparatus as set forth in claim 7 wherein said means for holding the fused salt electrolyte functions as the cathode means.

10. Apparatus as set forth in claim 7 wherein a screen is provided between said cathode means and said anode for preventing the recombination of the chlorine and cadmium.

11. Apparatus for the reduction of hydrogen chloride comprising a reactor having means for holding a pool of molten metal alloy comprising cadmium and tin and means for introducing hydrogen chloride into the pool to react with the cadmium to produce gaseous hydrogen and cadmium chloride, an electrolytic cell above said reactor having means for holding a fused salt electrolyte in surface to surface contact with the pool of molten metal alloy for receiving the cadmium chloride as a solute, an anode positioned intermediate said electrolytic cell in said fused salt electrolyte, cathode means spaced from said anode for electrolyzing the dissolved cadmium chloride to reduce the chloride to gaseous chlorine on the anode and a molten cadmium on the cathode, means in said electrolytic cell positioned above said molten metal alloy pool for guiding the hydrogen bubbling through the electrolyte separate from the chlorine gas for a separate discharge of the hydrogen and chlorine from the apparatus.

12. A process for the reduction of anhydrous hydrogen chloride comprising introducing gaseous anhydrous hydrogen chloride into a molten metal alloy of cadmium and a metal more noble than cadmium, reacting the hydrogen chloride with the cadmium metal to produce hydrogen and cadmium chloride, discharging the hydrogen and dissolving the cadmium chloride in a fused salt bath positioned in contact with the molten metal alloy, electrolyzing the fused salt bath and forming molten cadmium metal and chlorine in the bath separate from the gaseous hydrogen and discharging the gaseous chlorine from the fused salt bath separate from the gaseous hydrogen.

13. Apparatus for the reduction of hydrogen chloride comprising a reactor having means for holding a pool of molten metal alloy and means for introducing hydrogen chloride into the pool to react with one of the metals thereof to produce gaseous hydrogen and a metal chloride, an electrolytic cell above said reactor having means for holding a fused salt electrolyte in contact with the pool of molten metal alloy for receiving the metal chloride as a solute therein and the hydrogen as an upward flow of gaseous bubbles, cathode and an anode means for electrolyzing the metal chloride, said cathode having an inner chamber above the pool of molten metal alloy for receiving the gaseous hydrogen and having an outer surface for deposition of the molten metal of the metal chloride, said anode means being spaced from said cathode and said pool of molten metal alloy for reducing the metal chloride to chlorine and to isolate said chlorine from said gaseous hydrogen and molten metal, said cathode having means for discharging the gaseous hydrogen from said inner chamber and said cell having means for discharging the chlorine therefrom with the molten metal on said cathode returning to said pool for a continuous reduction of the hydrogen chloride fed to the pool of molten metal alloy.

14. An apparatus as set forth in claim 13 wherein a screen is provided between said cathode and said anode means for preventing the recombination of chlorine and the metal of the metal chloride.

References Cited

UNITED STATES PATENTS

| | | | |
|---|---|---|---|
| 663,719 | 12/1900 | Becker | 204—245 XR |
| 1,186,937 | 6/1916 | Pfleger et al. | 204—247 |
| 1,197,137 | 9/1916 | McNitt | 204—246 XR |
| 2,470,073 | 5/1949 | Low | 204—284 XR |
| 3,117,066 | 1/1964 | Juda | 204—292 XR |

JOHN H. MACK, *Primary Examiner.*

D. R. VALENTINE, *Assistant Examiner.*

U.S. Cl. X.R.

23—87, 212; 204—60, 245, 246, 247, 272